US 6,606,416 B1

(12) United States Patent
Yip et al.

(10) Patent No.: US 6,606,416 B1
(45) Date of Patent: Aug. 12, 2003

(54) ENCODING METHOD AND APPARATUS FOR REPRESENTING A DIGITAL IMAGE

(75) Inventors: Dominic Yip, Lindfield (AU); James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,181

(22) Filed: Oct. 26, 1999

(30) Foreign Application Priority Data

Oct. 30, 1998 (AU) .............................................. PP6866
Oct. 30, 1998 (AU) .............................................. PP6867

(51) Int. Cl.⁷ .............................. G06K 9/34; G06K 9/46
(52) U.S. Cl. ........................................ 382/240; 382/248
(58) Field of Search ................................ 382/232, 240, 382/244, 248, 251

(56) References Cited

U.S. PATENT DOCUMENTS 5,412,741 A * 5/1995 Shapiro ...................... 382/232
5,748,786 A    5/1998 Zandi et al. ................. 382/240
6,163,626 A   12/2000 Andrew ....................... 382/240

FOREIGN PATENT DOCUMENTS

| EP | 0 618 727 | 10/1994 | |
| EP | 0 855 838 | 7/1998 | |
| EP | 855838 | 7/1998 | ............ H04N/7/26 |
| WO | WO 97/32281 | 9/1997 | ............ G06T/9/40 |
| WO | WO 99/06250 | 2/1999 | ............ B60S/1/08 |
| WO | 00/35187 | 6/2000 | |

OTHER PUBLICATIONS

J. Andrew, "A Simple and Efficient Hierarchical Image Coder," Proceedings ICIP '97, Santa Barbara, USA, vol. 3, pp. 658–661, 1997.

A. Said and W.A. Pearlman, "A New, Fast and Efficient Image Codec Based on Set Partitioning in Hierarchical Trees," IEEE Transactions on Circuits and Systems for Video Technology, vol. 6, No. 3, pp. 243–250, Jun. 1996.

I. Stollinitz et al., "Wavelet For Computer Graphics", 1996, pp. ix–xiii and 1–5.

Bruce, Andrew et al., "Wavelet Analysis", IEEE Spectrum, Oct. 1996, vol. 33, pp. 26–35.

* cited by examiner

*Primary Examiner*—Phuoc Tran
(74) *Attorney, Agent, or Firm*—Fitzpatrick, Cella, Harper & Scinto

(57) ABSTRACT

The method encodes a digital image to provide a compressed representation of the image. The method initially performs a multi-level 2-D Discrete Wavelet Transform on the digital image, which is arranged in a hierarchical order of sub-bands. The method then tiles each sub-band to form a number of blocks of transform coefficients. The method then encodes each bitplane of each block from a maximum bitplane to a minimum bitplane in the following manner. The method divides a current bitplane into a number of first areas and/or a number of second areas, wherein each first area comprises a number of coefficients having corresponding most significant bits in the current bitplane or less and each second area comprises a number of coefficients having corresponding most significant bits in a bitplane greater than the current bitplane. The method then codes the significance of each first area in the current bitplane; and codes a corresponding bit of each coefficient in each second area of the current bitplane.

5 Claims, 6 Drawing Sheets

Fig. 4 Tiling of the subbands

ENCODING METHOD AND APPARATUS FOR REPRESENTING A DIGITAL IMAGE

FIELD OF INVENTION

The present invention relates in general to the coding of a block of coefficients and in particular to the coding of a block of transform coefficients of a digital image.

BACKGROUND OF INVENTION

The field of digital data compression and in particular digital image compression has attracted great interest for some time.

In the field of digital image compression, many different techniques have been utilized. In particular, one popular technique is the JPEG standard, which utilizes the discrete cosine transform to transform standard size blocks of an image into corresponding cosine components. The JPEG standard also provides for the subsequent compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 pages 26–35. For a discussion of the different applications of wavelets in computer graphics, reference is made to "Wavelets for Computer Graphics", I. Stollinitz et. al. published 1996 by Morgan Kaufmann Publishers, Inc.

It would be desirable to provide a method and hardware of an encoder so as to provide for efficient and effective encoding of a series of coefficients in order to substantially increase the speed of encoding.

SUMMARY OF THE INVENTION

According to still another aspect of the invention, there is provided an encoder for generating a coded representation of a digital image, said encoder comprising: an input means for inputting a block of coefficients of said digital image; a plurality of tree builders, wherein each tree builder generates a tree and nodes based on a corresponding bitplane of said block of coefficients, and each said node corresponds to one of a plurality of sub-regions of said block of coefficients or to one of said coefficients and each said node having a data value indicative of the significance of said one sub-region or said one coefficent for that bitplane; a bitplane converter for generating respective bitplanes from the block of coefficients; and a bitplane encoder coupled to said plurality of tree builders and said bitplane converter for producing a coded representation of the digital image from said trees and bitplanes, wherein said bitplane encoder codes the significance of said sub-regions or coefficients in a current said bitplane when said sub-regions and coefficients have corresponding most significant bits in the current bitplane or less and codes corresponding bits of coefficients in said current bitplane when said coefficients have corresponding most significant bits in a bitplane greater than the current bitplane.

BRIEF DESCRIPTION OF THE DRAWINGS

Embodiments of the invention are described with reference to the drawings, in which.

DETAILED DESCRIPTION

Where reference is made in any one or more of the accompanying drawings to steps and/or features, which have the same reference numerals, those steps and/or features have for the purposes of this description the same function (s) or operation(s), unless the contrary intention appears.
Preferred Embodiment(s) of Method The principles of the preferred method have general applicability to the encoding and decoding of a block of coefficients. For ease of explanation, the preferred method is described with reference to the encoding and decoding of a block of transform coefficients of an image and it it is not intended to be limited thereto. The method has also been described with reference to a number of specific examples of images and it is also not intended that the invention be limited to such specific examples.

The preferred method proceeds initially by means of a wavelet transform of image data. An overview of the wavelet process will now be described with reference to the accompanying drawings.

Figure 1A:
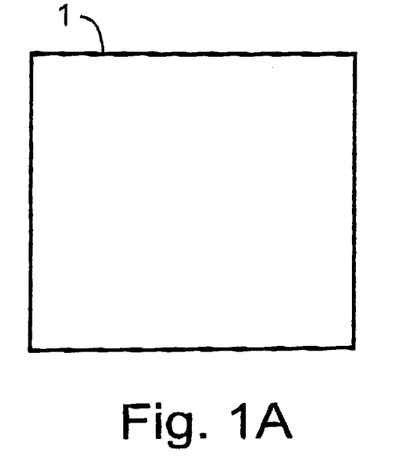
FIG. 1A illustrates an original image.
Figure 1B:
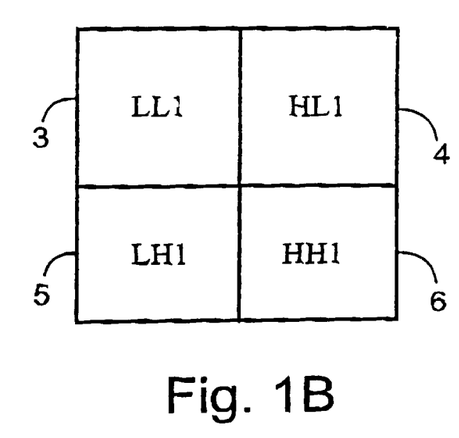
FIG. 1B illustrates a DWT transformation of the original image of FIG. 1A.

Referring initially to FIGS. 1A and 1B, an original image 1 is transformed utilizing a Discrete Wavelet Transform (DWT) into four sub-images 3–6. The sub-images or sub-bands are normally denoted by LL1, HL1, LH1 and HH1. The one suffix on the subband names indicates level 1. The LL1 subband is a low pass decimated version of the original image.

Figure 2:
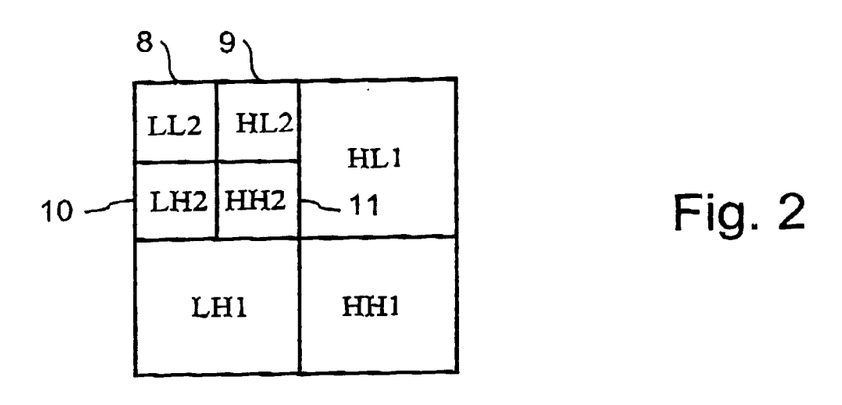
FIG. 2 illustrates a second level DWT transformation of the original image shown in FIG. 1A.
Figure 3:
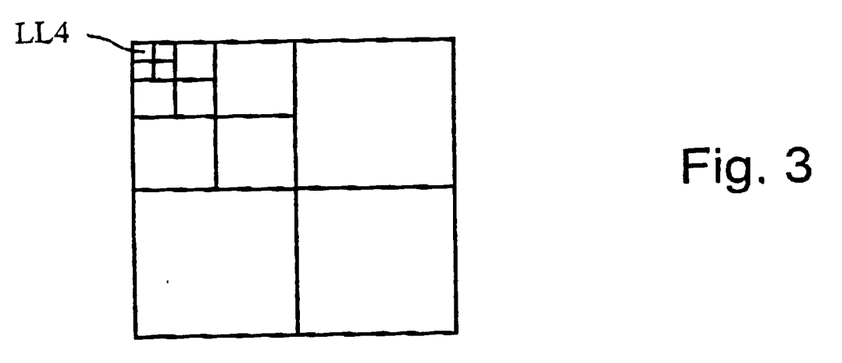
FIG. 3 illustrates a four level DWT transformation of the original image shown in FIG. 1A.

The wavelet transform utilized can vary and can include, for example, Haar basis functions, Daubechies basis functions etc. The LL1 subband is then in turn utilized and a second Discrete Wavelet Transform is applied as shown in FIG. 2 giving subbands LL2 (8), HL2 (9), LH2 (10), HH2 (11). This process is continued for example as illustrated in FIG. 3 wherein the LL4 subband is illustrated. Obviously, further levels of decomposition can be provided depending on the size of the input image. The lowest frequency subband is referred to as the DC subband. In the case of FIG. 3, the DC subband is the LL4 subband.

Each single level DWT can, in turn, be inverted to obtain the original image. Thus, a J-level DWT can be inverted as a series of J-single level inverse DWT's.

To code an image hierarchically the DC subband is coded first. Then, the remaining subbands are coded in order of decreasing level. That is for a 4 level subband, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information in an image. After quantisation of the subbands, they often consist of a sparse array of values and substantial compression can be achieved by efficient encoding of their sparse matrix form.

Figure 4:
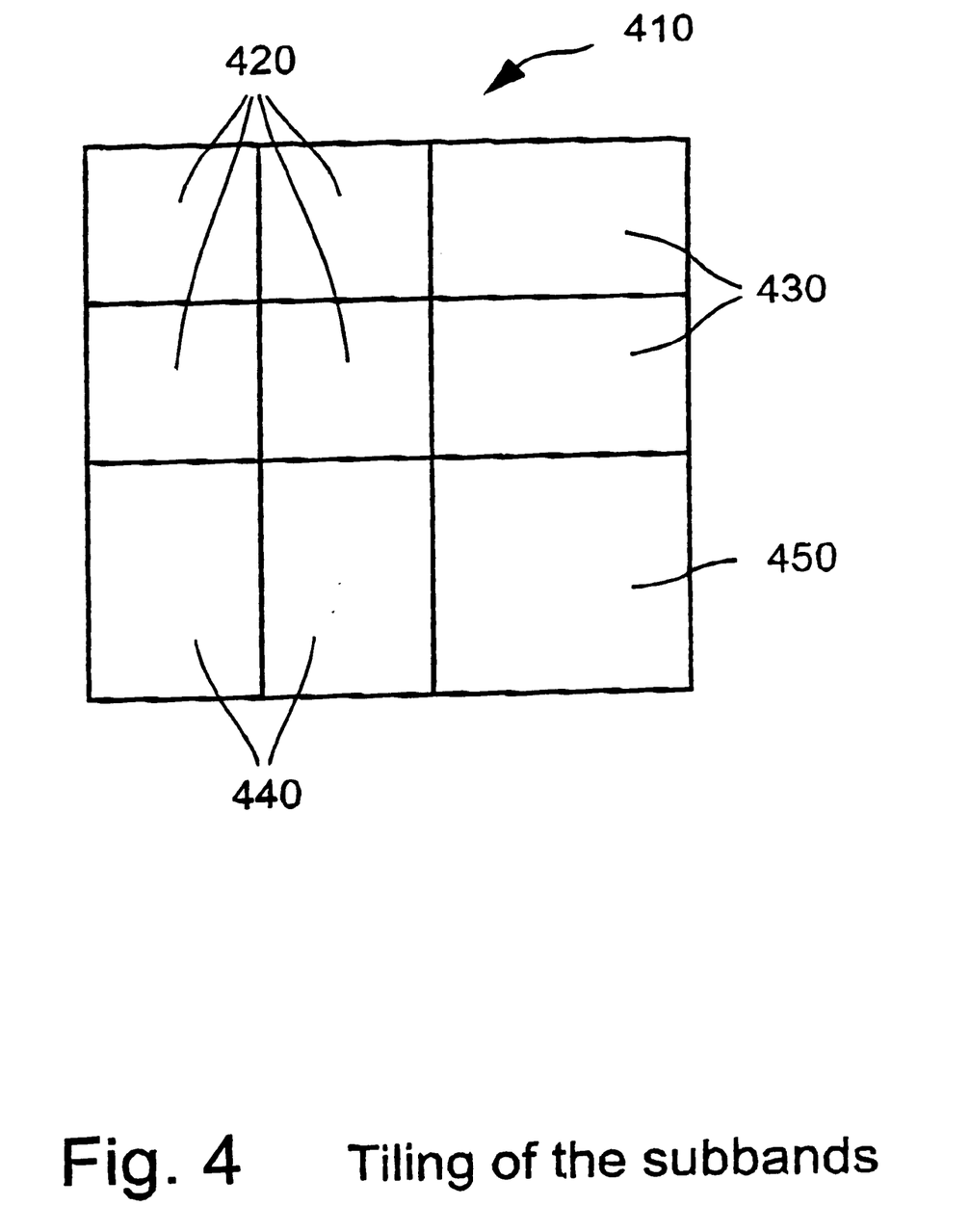
FIG. 4 illustrates the tiling of the subbands into 32×32 blocks.

Turning now to FIG. 4, there is shown the tiling of the subbands, such as HH1. The subbands are preferably tiles 410, 420, 430, 440 and 450 with 32×32 blocks of coefficients beginning from the top left-hand corner. The nomenclature 32×32 refers to 32 rows by 32 columns respectively.

Before proceeding with a description of the embodiments, a brief review of terminology used hereinafter is provided. For a binary integer representation of a number, "bit n" or "bit number n" refers to the binary digit n places to the left of the least significant bit (beginning with bit 0). For example, assuming an 8-bit binary representation, the decimal number 9 is represented as 00001001. In this number, bit 3 is equal to 1, while bits 2, 1, and 0 are equal to 0, 0, and 1, respectively. In addition, a transform of an image may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space that passes through each bit sequence at the same bitnumber is referred to as a "bitplane" or "bit plane". The term "bit plane number n" refers to that bit plane that passes through bit number n.

To simplify the description and not to obscure unnecessarily the invention, the transform coefficients are assumed hereinafter to be represented in a fixed point unsigned binary integer format, with an additional single sign bit. Preferably, 16 bits is used. That is, the decimal numbers −9 and 9 are represented with the same bit sequence, namely 1001, with the former having a sign bit equal to I to indicate a negative value, and the latter having a sign bit equal to 0 to indicate a positive value. In using an integer representation, the coefficients are implicitly already quantized to the nearest integer value, although this is not necessary for embodiments of the invention. Further, for the purpose of compression, any information contained in fractional bits is normally ignored.

A region of an image frame includes a set of contiguous image coefficients. The term coefficient is used hereinafter interchangeably with pixel, however, as will be well understood by a person skilled in the art, the former is typically used to refer to pixels in a transform domain (eg., a DWT domain). These sets or regions T are defined as having transform image coefficients $\{c_{i,j}\}$, where (i,j) is a coefficient coordinate.

A set or the region T of pixels at a current bit plane is said to be insignificant if the msb number of each coefficient in the region is less than the value of the current bit plane. To make the concept of region significance precise, a mathematical definition is given in Equation (1). A set or region T of pixels is said to be insignificant with respect to (or at) bit plane n if, $$|c_{i,j}| < 2^n, \text{ for all } c_{i,j} \in T \quad (1)$$

By a partition of a set T of coordinates we mean a collection $\{T_m\}$ of subsets of T such that $$T = \cup_n T_n, \ T_n \cap T_m = 0 \ \forall n \neq m$$

In other words if $c_{i,j} \in T$ then $c_{i,j} \in T_m$ for one, and only one, of the subsets $T_m$. In our case T is a square region and the set $\{T_m\}$ is the set consisting of the four quadrants of T.

The preferred method encodes a set of coefficients in an embedded manner using quadtrees. The use of the term embedded is taken to mean that every bit in a higher bit plane is coded before any bit in a lower bit plane. For example, every bit is coded in bit plane 7 before any bit in bit plane 6. In turn, all bits in bit plane 6 are coded before any bit plane 5 and so on.

A preferred embodiment of the preferred method is implemented utilizing the following pseudo-code. The preferred method preferably encodes a square block of coefficients, with a block size that is a power of 2 (typically 32×32 coefficients). Further, the preferred method utilizes a quadtree partition: that is each set or region is partitioned into its 4 quadrants: thus maintaining at all times square regions with a dimension equal to a power of two. The preferred method, during commencement, initializes three lists: a list of insignificant regions (LIR); a list of insignificant coefficients (LIC); and a list of significant coefficients (LSC). When single coefficients are removed from the list of insignificant sets (LIR), they are added to either the list of insignificant coefficients (LIC) or to the list of significant coefficients (LSC), depending on the significance of the coefficient.

The preferred method is initialized as follows. The LIC and LSC are initialized to be empty. The LIR is set to contain the four quadrants of the input block. The method commences by finding and coding $n_{max}$, which is the largest bit plane that contains a 1 bit in any one of the coefficients in the bitplane. Or in other words, the most significant bit of each coefficient is in bitplane $n_{max}$ or less. The encoded $n_{max}$ can be included in a header or sub-header of the bitstream for transmission. The preferred method then proceeds as follows:

1. Set $n = n_{max}$
2. For each coefficient in the list of insignificant coefficients (LIC)
   Code bit n of the coefficient (i.e. its significance)
   If the bit is 1 (i.e. it is significant) code a sign bit. Add the coefficient to the end of the LSC and remove the coefficient from the LIC.
3. For each region T in the list of insignificant regions (LIR)
   Code the significance of T.
   If T is significant and consists of more than one coefficient then partition T into its four quadrants and add these to the end of the LIR. Remove T from the list.
   If T is a single coefficient
   Remove T from the LIR
   If T is significant code a sign bit and add T to the end of the LSC
   Else add T to the end of the list of LIC
4. For each coefficient $c_{i,j}$ in the list of significant LSC (excluding those added to the list in step 3)
   Code bit n of $c_{i,j}$.
5. decrement n and go to step 2.

From the above, it can seen that output bitstream generally takes the following form

...LIC'LIR'LSC'...

where LIR' is the coded representation undertaken in step 3; LIC' is the coded representation undertaken in step 2; and LSC' is the coded representation undertaken in step 4. However, it should be noted that during the first iteration of the encoding process both LIC and LSC are empty and thus the output bitstream for the first iteration takes the form LIR'.

In addition to the preferred method, a simple Huffman code (or better a Golomb code) may be used to code groups of bits (for example groups of 4 bits) when coding the LIC and LSC. Further, when coding the significance of each quadrant of a region a 15-level Huffman code may be used to indicate the significance pattern of each of the 4 quadrants (one quadrant must be significant, hence the significance pattern can be one of 15 (and not 16) different patterns. Other forms of entropy encoding can be used, such as binary arithmetic coding to exploit any remaining redundancy.

As an alternative embodiment, the preferred method at step 3 if T consists of a 2×2 block of coefficients, may perform the following substep. Immediately code and output the significance of each coefficient of the 2×2 block, output the corresponding sign bit(s) if they are significant; and then add the coefficients to the end of the LSC or the LIC as appropriate. In the latter substep, the significant coefficients are added to the LSC list whereas the insignificant coefficients are added to the LIC list.

Preferably, the preferred method encodes a 32×32 block of data coefficients. For illustrative purposes only, the following example of a 4×4 block of coefficients is encoded in accordance with the preferred method.

$$\begin{bmatrix} 31 & 16 & 0 & 0 \\ 15 & 17 & 0 & 0 \\ 9 & 7 & 1 & 0 \\ 5 & 3 & 1 & 0 \end{bmatrix}$$

The above block consists of four quadrants A, B, C and D. The symbol A designates the top-left (2×2) quadrant of the block, B the top right, C the bottom left, and D the bottom right quadrant respectively. Furthermore, the symbols A1 denote the top left pixel of A, A2 the top right, A3 the bottom left, A4 the bottom right pixels respectively. Similarly B1 denotes the top left pixel of B and so on for the rest of the pixels.

According to the preferred method, $n_{max}$ is first determined, which in this case is 4. That is, the most significant bit of each coefficient is in bit plane 4 or less. Note, the numbering of the bit planes commences from 0. The variable $n_{max}$ is coded with 4 bits (since the coefficients have been constrained, so that $n_{max}$ is between 0 and 15.). Initially LIC=φ, LIR={A, B, C, D} and LSC=φ where symbol φ is used to denote the empty list.

Then, according to the preferred method, the bit planes are iteratively coded. The process commences at bit plane $n=n_{max}=4$, and decrements n by one at each iteration.

1. At $n=n_{max}=4$

First, each coefficient in the list LIC is coded. Since there are none, no coding is undertaken.

Then, the significance of each region in the list LIR is coded.

For region A, a 1 bit is outputted, since it is significant at bit plane n=4. Then, the four quadrants of A are added, namely A1, A2, A3 and A4, to the end of the list LIR, and A is removed. Hence now LIR={B, C, D, A1, A2, A3, A4}.

For region B, a 0 bit is output, since it is insignificant at bit plane n=4.

For region C, a 0 bit is output.

For region D, a 0 bit is output.

For region A1, a 1 bit is output. Since A1 consists of the single coefficient 31, A1 is removed from the LIR. Since 31 (or A1) is significant, it is added (or its location in the block) to the LSC. The sign bit (0) of A1 is also outputted.

For region A2, a 1 bit is output. Since A2 consists of the single coefficient 16, it is removed from the LIR, and added to the end of the LSC. The sign bit (0) of A2 is also outputted. Now we have LSC={31, 16}.

For region A3, a 0 bit is output. Since it is a single insignificant coefficient we remove it from the LIR, add the coefficient 15 to the LIC. Now LIC={15}.

For region A4, a 1 bit is output. Since A4 consists of the single significant coefficient 17, it is removed from the LIR, and added to the end of the LSC. The sign bit (0) of A4 is also outputted. Now LSC={31, 16, 17}.

Each coefficient in the LSC that was not added in the last step is now coded. Since there are none, no coding is undertaken.

Thus at the first iteration, the preferred method outputs the following bitstream 1000 10 10 0 10

At this stage, all the bits in bit plane 4 (and higher) have been coded. That is a decoder can reconstruct bit plane 4 (and higher) by reading in the bits from the coded bit stream. The decoding method is the same except that the significance decisions are determined by reading from the bit stream (this is why the significance decision is written to the bit stream). The other coefficient bits are simply read in as is. Note that the decoder execution path is identical to the encoder, so that the decoder knows the meaning of each new bit that it reads.

2. At n=3

Initially LIC={15}, LIR={B, C, D} and LSC={31, 16, 17}.

Firstly, bit n=3 of each coefficient in the LIC is coded. That is, a 1 bit is output for the coefficient 15 and a sign bit (0). Since it is significant (a 1 bit has been outputted), a sign bit is outputted, the coefficient 15 is removed from LIC and added to the end of the LSC. So now LSC={31, 16, 17, 15}.

The significance of each of the regions in LIR are now coded

For region B, a 0 bit is output.

For region C, a 1 bit is output, since it is significant at bitplane n=3. The region C is partitioned into four quadrants C1, C2, C3 and C4 which are added to the end of LIR. C is then removed from LIR. Hence now LIR={B,D, C1,C2,C3,C4}.

For region D, a 0 bit is output.

For region C1, a 1 bit is output. Since C1 consists of the single significant coefficient 9, it is removed from the LIR, and added to the end of the LSC. The sign bit (0) of C1 is also outputted. Now we have LSC={31, 16, 17, 15, 9}.

For region C2, a 0 bit is output. Since it is a single insignificant coefficient we remove it from the LIR, add the coefficient 7 to the LIC. Now LIC={7}.

For region C3, a 0 bit is output. Since it is a single insignificant coefficient we remove it from the LIR, add the coefficient 5 to the LIC. Now LIC={7,5}.

For region C4, a 0 bit is output. Since it is a single insignificant coefficient we remove it from the LIR, add the coefficient 3 to the LIC. Now LIC={7,5,3}

Now we code bit n=3 of each coefficient on the LSC (that was not just added above)

We output 1, 0, and 0 as bit n=3 of 31, 16 and 17 respectively

Thus at the second iteration, the preferred method outputs the following bitstream 10 0 1 0 10 0 0 0 1 0 0

3. At n=2

Initially we have LIC={7, 5, 3}, LIR={C, D} and LSC={31, 16, 17, 15, 9}.

Firstly, bit n=2 (or equivalently the significance at bit plane n=2) of each coefficient in the LIC is coded. That is, we output a 1, 1, and 0 for 7, 5, and 3 respectively. In addition, a sign bit for 7 (0) and 5 (0) is outputted and these coefficients are moved to the LSC. We leave 3 in the LIC.

Then the significance of each region in the LIR is coded

For region B, a 0 bit is output and for region D a 0 bit is output.

Finally we update bit n=2 for each of the coefficients in the LSC (not added above).

We output a 1, 0, 0, 1, and 0 for 31, 16, 17, 15 and 9 respectively.

Thus at the third iteration, the preferred method outputs the following bitstream 10 10 0 0 0 1 0 0 1 0

We continue in this fashion until bit plane 0, or some other terminating point. Note that we can terminate after any one of the (three) sub-passes, is we use a special termination code. (Basically FF is reserved as a termination code, and we force the coded bit stream never to contain an FF, unless we deliberately insert a termination code.

As mentioned previously, the method is preferably utilized in encoding 32×32 blocks of coefficients. In these circumstances, the original quadrants A,B,C,D each consist of 16×16 coefficients and the regions A1,A2, . . . D4 each consist of 8×8 coefficients. It will be thus evident in encoding a 32×32 block, the block is partitioned in accordance with quadtree method five times, whereas in the example given the 4×4 block is partitioned only twice.

The decoding process simply mimics the encoding process to reconstruct the pixels from the coded representation. The decoding process builds the LIC, LIR, and LSC lists for each bitplane from the bitstream and from a knowledge of the partitioning process. From these lists the decoding process then generates the bit values for the bitplane.

For illustrative purposes only, the following example explains the decoding of the bitstream of the previous example. Firstly, the decoding method receives and decodes $n_{max}$. The method sets all bit values in the bitplanes greater than $n_{max}$ to zero. The method then decodes the bit values for the bitplane $n_{max}$. Initially, the decoding method decodes the following portion of the bitstream 1000 10 10 0 10

Initially, the LIC, LIR and LSC lists are set as follows: LIC=φ, LIR={A, B, C, D} and LSC=φ. The process then decodes the bitstream with reference to the LIC list. Since the LIC is empty no decoding is undertaken. Next, the process decodes the bitstream with reference to the LIR list. Thus region A will allocated a 1 bit (the first bit in the bitstream 1000 10 10 0 10). The decoding method has an inherent knowledge of the partitioning process, and in response to this 1 bit updates the LIR list as follows {B, C, D, A1, A2, A3, A4}. The decoding process continues with the bits in the bitstream allocating region B the 0 bit, region C the next 0 bit, region D the next 0 bit, coefficient A1 the bits 10, coefficient A2 the next bits 10, coefficient A3 the bit 0, and coefficient A4 the bits 10. From these values the bitplane at $n_{max}$ can be generated. During this stage, LIC and LSC lists are also updated resulting in LSC={A1,A2,A4} and LIR={A3}. These updated lists will be used in the decoding of the subsequent bits of the bitstream in generating the bit values of the next bitplane $n_{max-1}$. As can be seen, the decoding process mimics the encoding process in order to reconstruct the pixels.

First Preferred Embodiment of Encoding Apparatus

Figure 5:
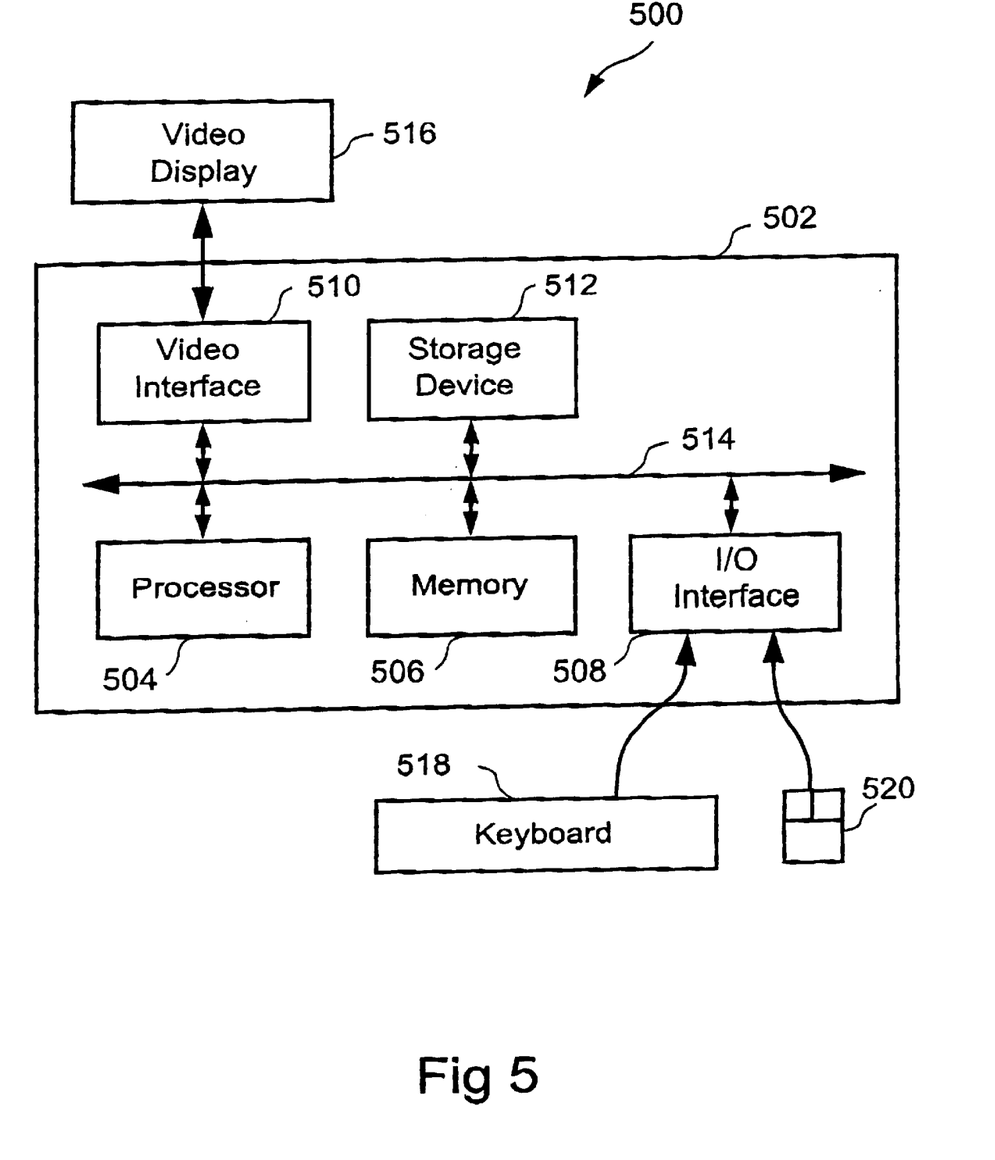
FIG. 5 illustrates a general-purpose computer for implementing the preferred method in accordance with a first preferred embodiment.

The encoding processes of the preferred method can be practiced using a conventional general-purpose computer, such as the one shown in FIG. 5, wherein the processes may be implemented as software executing on the computer. In particular, the steps of the coding methods are effected by instructions in the software that are carried out by the computer. The software may be divided into two separate parts; one part for carrying out the encoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images in accordance with the embodiments of the invention.

The computer system 500 consists of the computer 502, a video display 516, and input devices 518, 520. In addition, the computer system 500 can have any of a number of other output devices including line printers, laser printers, plotters, and other reproduction devices connected to the computer 502. The computer system 500 can be connected to one or more other computers via a communication interface using an appropriate communication channel such as a modem communications path, a computer network, or the like. The computer network may include a local area network (LAN), a wide area network (WAN), an Intranet, and/or the Internet The computer 502 itself consists of a central processing unit(s) (simply referred to as a processor hereinafter) 504, a memory 506 which may include random access memory (RAM) and read-only memory (ROM), input/output (IO) interfaces 508, a video interface 510, and one or more storage devices generally represented by a block 512 in FIG. 5. The storage device(s) 512 can consist of one or more of the following: a floppy disc, a hard disc drive, a magneto-optical disc drive, CD-ROM, magnetic tape or any other of a number of non-volatile storage devices well known to those skilled in the art. Each of the components 504 to 512 is typically connected to one or more of the other devices via a bus 514 that in turn can consist of data, address, and control buses.

The video interface 510 is connected to the video display 516 and provides video signals from the computer 502 for display on the video display 516. User input to operate the computer 502 can be provided by one or more input devices 508. For example, an operator can use the keyboard 518 and/or a pointing device such as the mouse 520 to provide input to the computer 502.

The system 500 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 512 in FIG. 5) as the computer readable medium, and read and controlled using the processor 504. Intermediate storage of the program and pixel data and any data fetched from the network may be accomplished using the semiconductor memory 506, possibly in concert with the hard disk drive 512.

In some instances, the program may be supplied to the user encoded on a CD-ROM or a floppy disk (both generally depicted by block 512), or alternatively could be read by the user from the network via a modem device connected to the computer, for example. Still further, the software can also be loaded into the computer system 500 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

Second Preferred Embodiment of Encoding Apparatus.

The encoding method may alternatively be implemented in dedicated hardware such as one or more integrated circuits performing the functions or sub functions of the encoding processes.

Figure 6:
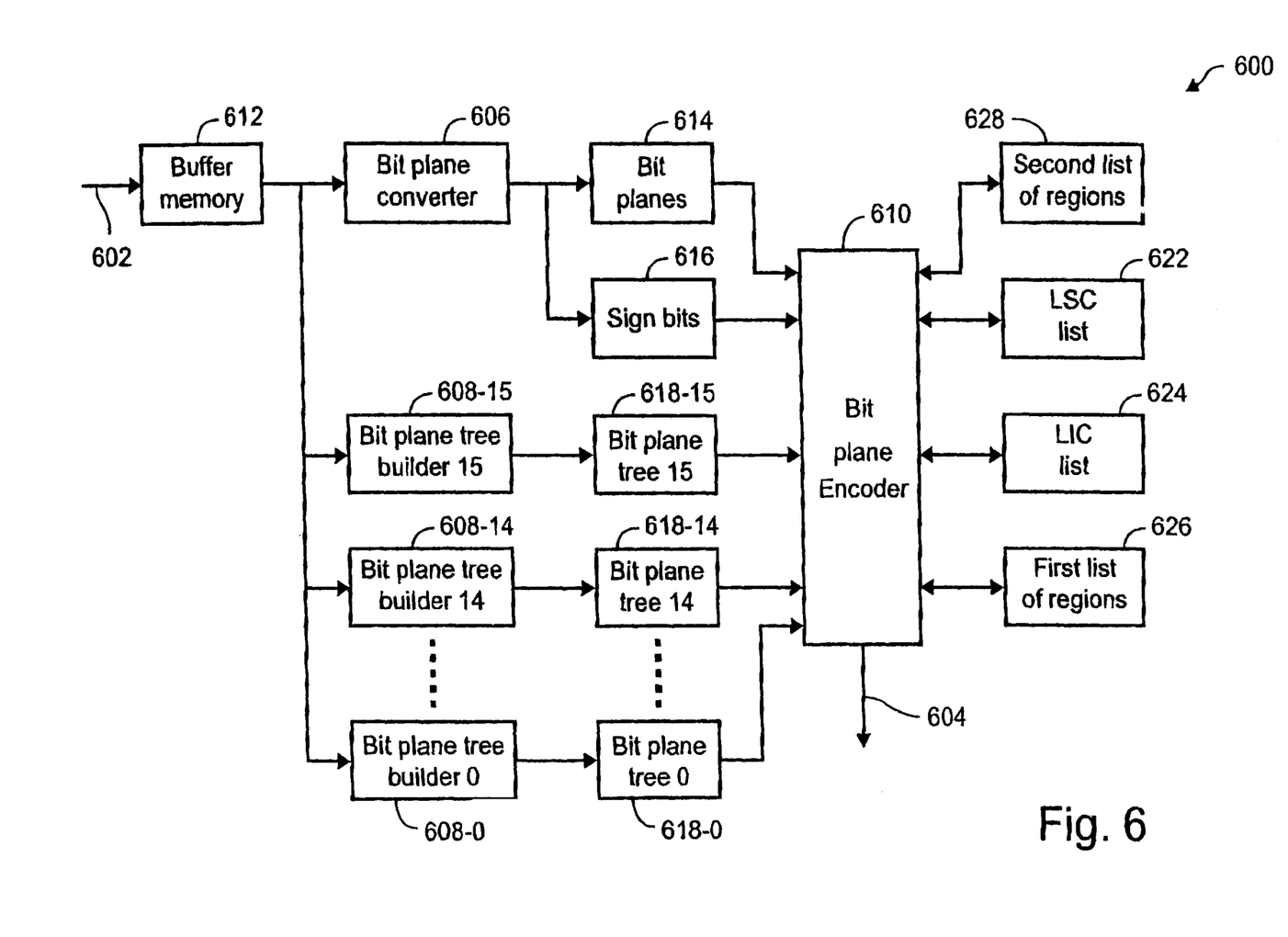
FIG. 6 illustrates an encoder in accordance with a second preferred embodiment.

Turning to FIG. 6, there is shown an encoder in accordance with a second preferred embodiment for implementing the preferred encoding method. The coefficient encoder 600 is designed to provide a continual flow of output encoded data 602 taking in corresponding data 604. The encoder 600 includes the following logic portions; a bit plane converter 606; bit plane tree builders 608-0 to 608-15; and a bit plane encoder 610.

The encoder 600 also includes a memory 614 for storing the 32×32 coefficients in bit planes; a memory 616 for storing the sign bits of the coefficients; and memories 618-15 to 618-0 for storing bit plane trees 0 to 15. The encoder 600 further includes a memory 626 for storing a first list of regions; a FIFO memory 628 for storing a second list of regions; a memory 622 for storing a list of LSC values; and a memory 624 for storing a list of LIC values.

The encoder 600 operates in the following manner. Initially, the 32×32 input coefficient data are stored in the memory 612 in raster order. The bit plane converter 606 reads the input coefficient data and converts the data into 16 bit planes from bitplane 0 through to bitplane 15, which are subsequently stored in memory 614. The bit plane converter 606 also determines the sign bit of the coefficient of the 32×32 block, which sign bits are stored in memory 616.

The bit plane tree builders 608-0 to 608-15 each read the 32×32 coefficient data and construct a quadtree structure having nodes corresponding to regions and 1×1 pixels. In each tree, the nodes are set to 1 if the region or pixel corresponding to that node is significant for that bitplane. If the significant bit for the region or pixel corresponding to that node is greater than or less than the bitplane then the node is set to zero.

Figure 7:
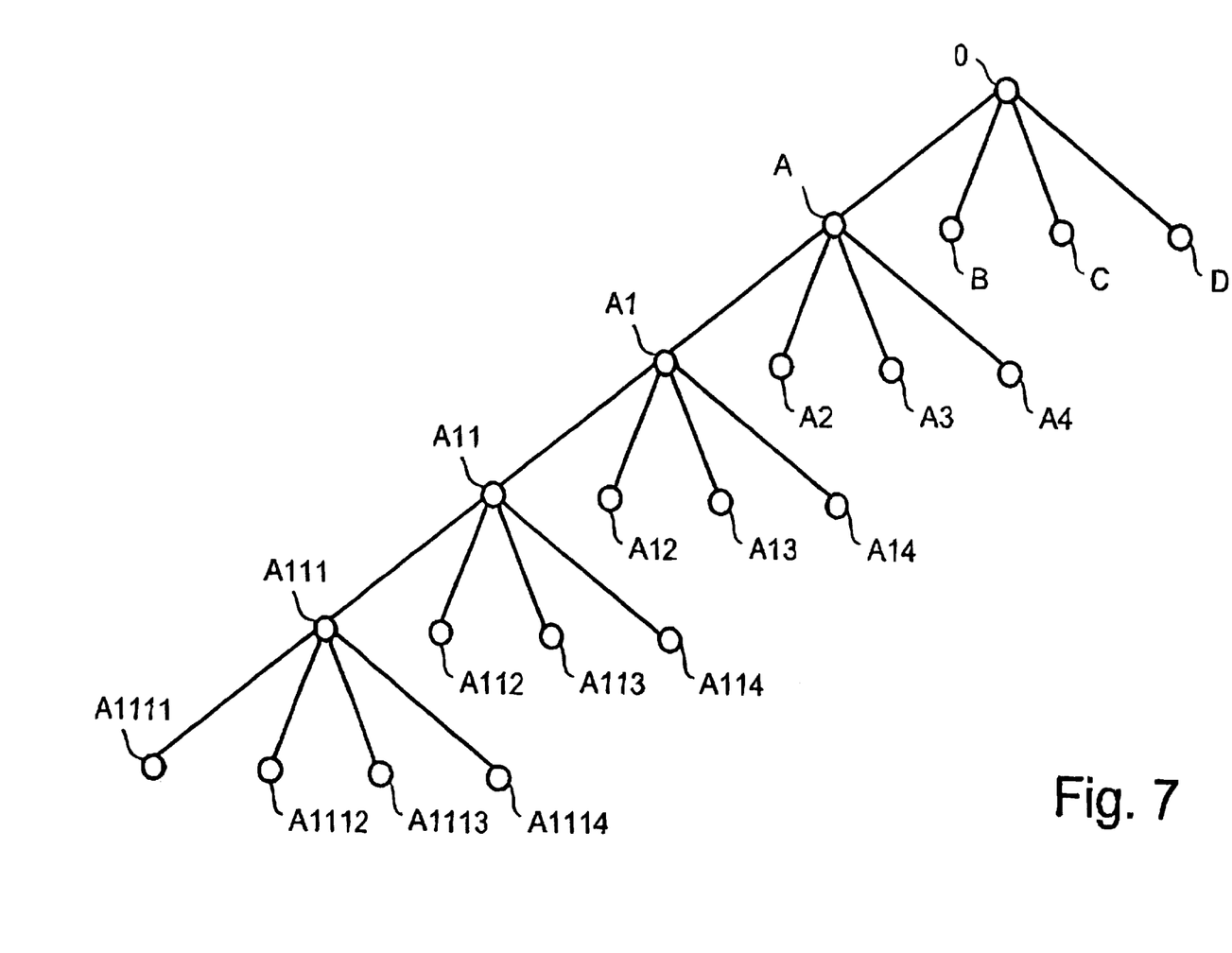
FIG. 7 illustrates a portion of a tree constructed by a bitplane tree builder of FIG. 6.

Turning now to FIG. 7, there is shown a constructed tree 700 built by a bitplane treebuilder 608-n at a bitplane n for a 32×32 block. For simplicities sake only a portion of the tree is shown. The tree 700 includes nodes representing each quadtree partition of the block down to the 1×1-pixel level. In this tree, the whole 32×32 block is represented by the symbol O. The 16×16 top left quadrant is represented by node A, the 16×16 top right quadrant is represented by B, the 16×16 bottom left quadrant is represented by node C, the 16×16 bottom right quadrant is represented by node D. The nodes A1,A2,A3, and A4 represent the top left, top right, bottom left, and bottom right 8×8 quadtree partitions of the quadrant A respectively. Similarly, the nodes A11, A12,A13, and A14 represent the top left, top right, bottom left, and bottom right 4×4 quadtree partitions of the quadrant A1 respectively. Similarly the nodes A111,A112,A113, and A114 represent the top left, top right, bottom left, and bottom right 2×2 quadtree partitions of the quadrant A11 respectively. Finally, the nodes A1111,A1112,A1113, and A1114 represent the top left, top right, bottom left, and bottom right 1×1 quadtree partitions (i.e. pixels) of the quadrant A111 respectively. The remaining parts of the tree (not shown) is represented in a similar manner down to each 1×1 quadrant of the 32×32 block.

The bit plane treebuilder 608-n builds such a tree from bottom up for bitplane n by reading the coefficients in quadrant order (e.g. A1111,A1112,A1113, and A1114). The tree builder sets the nodes of the tree to 1 if the region or pixel corresponding to that node is significant for that bitplane. If the significant bit for the region or pixel corresponding to that node is greater than or less than the bitplane then the node is set to zero by the tree builder. The bit plane tree builder then outputs the significance information for each node in the following format.

A B C D A1 A2 A3 A4 A11 A12 A13 A14 A21, . . . , D44 A111, . . . , D444 A1111, . . . , D4444

The output from each of the bitplane tree builders 608-0 to 608-15 are then stored in respective bitplane tree memories 618-0 to 618-15.

The bit plane encoder 610 reads each of the bit plane tree memories in turn, commencing with bit plane tree memory 618-15. The bit plane encoder 610 starts processing by reading in turn the four significance bits A,B,C, and D stored in the bit plane memory 618-15 corresponding to the nodes A, B, C, and D. The bit plane encoder stores a list of these nodes {A,B,C,D} in a first list of regions in memory 626. The bit plane encoder 610 then proceeds with the following operations:

1. The bit plane encoder 610 reads the bit in the bit plane tree corresponding to the first node (region) on the first region list.
    a. If the bit is significant, the encoder outputs a binary one. The encoder then stores the children of the node in the second region list on the FIFO 628 and removes the node from the first region list 626.
    b. If the bit is insignificant, the encoder outputs a binary zero and retains the node on the first region list 626.
2. The bit plane encoder 610 repeats step 1 until all nodes in the first region list have been read.
3. The bit plane encoder reads the bit in the bit plane tree corresponding to the first node in the second region list on the FIFO 628.
    a. If the bit is insignificant and there are children to that node (viz. there are nodes directly below that node in the tree), the encoder outputs a binary zero and puts that node on first region list 626.
    b. If the bit is insignificant and there are no children to that node, the encoder outputs a binary zero and that node is stored on the LIC list 624 as an index to the corresponding pixel.

c. If the bit is significant and has no children to that node, the encoder outputs a binary one and the corresponding sign bit and stores that node on the LSC list 622 as an index to the corresponding pixel.

d. If the bit is significant and has children to that node, the encoder outputs a binary one and removes the node from the second region list. In addition, it adds the children of that node to the second region list.

e. If the second region list is empty, the encoding process is completed for that bit plant tree.

The bit plane encoder repeats this operation for the remaining bit plane trees in turn. The first list of regions at the start of the operation on the current bitplane tree contains those regions remaining from the previous operation on the previous bitplane tree. These outputs bits correspond to the LIR' portion of the output stream. After completion of a current operation for a current bitplane tree, the bitplane encoder then encodes and outputs the LIC and LSC bits.

The bit plane encoder encodes the LIC bits by reading the LIC list for the index to the first pixel on the list, and using the current bit plane number selects the bit needed from the bit plane memory 614. If the selected bit is a binary zero, then the encoder outputs a zero. If the selected bit is a binary one, then the encoder outputs a binary one together with the sign bit of the pixel from memory 616. The encoder then removes the index from the LIC list and adds it to the LSC list. Preferably, once an index is removed from the list, the remaining indices are reorganized. The encoding is completed once the LIC list is traversed.

The bit plane encoder 600 encodes the LSC bits by reading the LSC list for the index to the first pixel on the list, and using the current bit plane number to select the bit needed from the bit plane memory 614. The selected bit is then outputted. The bit plane encoder also includes a counter for storing a length value, which is indicative of the number of pixels in the LSC list to be read. At the end of the LSC encoding the value is updated so that the new elements from LIR and LIC can be added.

Third Preferred Embodiment of Encoding Apparatus.

Figure 8:
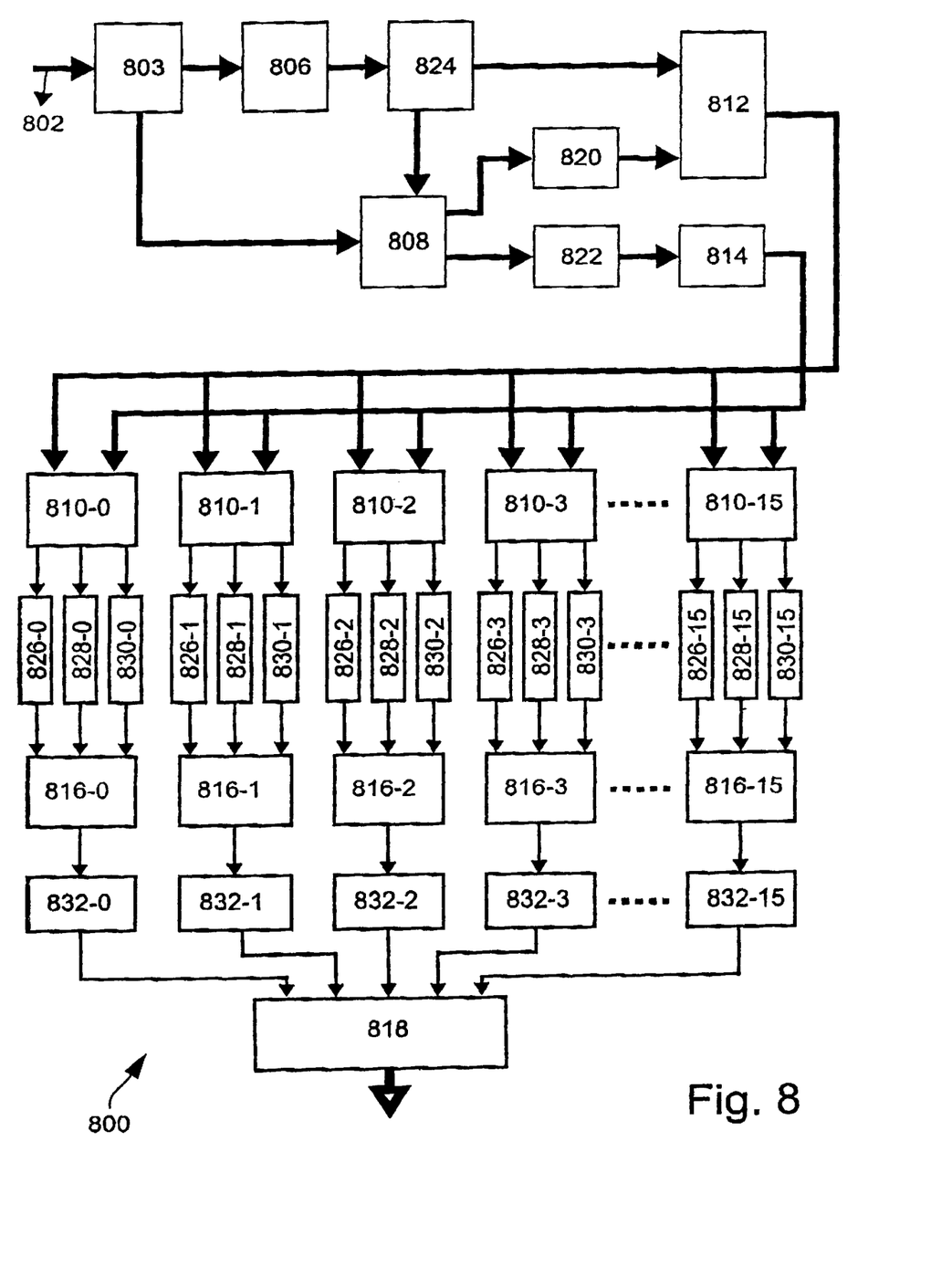
FIG. 8 illustrates an encoder in accordance with a third preferred embodiment.

Turning to FIG. 8, there is shown an encoder in accordance with a third preferred embodiment for implementing the preferred encoding method. The coefficient encoder 800 is designed to provide a continual flow of output encoded data 804 taking in corresponding data 802.

The encoder 800 includes the following main logic portions; a tree builder 806, a tree node sorter 808, a LIC-LIR reader 812, a LSC reader 814, bit plane encoders 810-0 to 810-15 in parallel, bit plane code combiners 816-0 to 816-15 in parallel, and a block code combiner 818.

The encoder 800 also includes the following main storage portions; a memory 824 for storing a maximum bit plane tree; a memory 820 for storing a list of insignificant coefficients (LIC) and a list of insignificant regions (LIR), a memory 822 for storing a list of significant coefficients (LSC); LIR storage elements 826-0 to 826-15; LIC storage elements 828-0 to 828-15; LSC storage elements 830-0 to 830-15; and bit plane code buffers 832-0 to 832-15.

The encoder 800 operates in the following manner. A 32×32 block of coefficients are stored in a buffer 803 and fed in raster order to both the tree builder 806 and the tree node sorter 808. The tree builder 806 builds, for each 32×32 block, a tree wherein the nodes of tree correspond to the quadrants of the block. That is, the top node of the tree corresponds to the whole block, the four child nodes of the top node correspond to the quadrants A,B,C, and D and so on. The tree continues downwards until the 1×1 regions (i.e. pixels) are reached. The tree builder 806 allocates, for each node in the tree, the bit plane number of the maximum significant bit plane of the region corresponding to that node. For instance, in the example given above, region 'A' consists of coefficients 31, 16, 15, and 17. In this case, node 'A' of the tree will be allocated with the bit plane number 4.

In addition, nodes 'A1', 'A2', 'A3', and 'A4' of the tree will be allocated with the bit plane numbers 4, 4, 3, and 4 respectively. The tree builder 806 outputs and stores this tree to a buffer 824.

The tree node sorter 808 sorts the regions (including 1×1 regions) of the block in a predetermined manner and feeds these either to the LIC/LIR list 820 or the LSC list 822.

The tree node sorter 808 has an internal list, which is made up of sublists, one for each bit plane number. The tree node sorter 808 sorts the regions of the block in the following manner:

1. The tree node sorter 808 reads the bit plane number of the top four nodes of the tree from the buffer 824, and inserts these nodes into the sublists, according to the bit plane number of the node. If two nodes have the same bit plane number, then the node on the left side of the tree appears first on the sublist.

2. At the same time, the tree node sorter 808 writes the four nodes into the LIC/LIR list 820, with the nodes in order from left to right [i.e. the far left one first, the far right one last]. The LIC/LIR list 820 is made up of an array of said regions.

3. The tree node sorter 808 then gets the region at the head of the first non-empty sublist, and get its four child nodes. If these child nodes are regions, the tree node sorter 808 then inserts them into the sublists, according to their respective bit plane number. If these child nodes are coefficients, they are not inserted in the sublists.

4. At the same time, the tree node sorter 808 writes the four child nodes into the LIC/LIR list 820, with the nodes in order from left to right [i.e. the far right one last].

5. Also, if the child nodes are coefficients, the tree node sorter 808 inserts them into the LSC coefficient list 822. The LSC coefficient list 822 is made up of sublists, one for each bit plane number. The new coefficients are added at the end of the LSC sublist according to their bit plane number.

6. The tree node sorter 808 repeats step 3 until the internal list is empty.

The LIC/LIR reader 812 accesses and reads each region or coefficients of the LIC/LIR list 820 in order and the corresponding node stored in the buffer 824. The reader 812 generates and outputs, for each read region, the bit plane number of the maximum significant bit plane for the read region (hereinafter called max_bit). The reader 812 also outputs, for each read region, the bit plane number of the maximum significant bit plane of the region consisting of the read region and its sibling quadrants (hereinafter called max_max_bit). The reader 812 also outputs, for each read region, a flag indicating whether the read region is pixel or a region. This data is outputted in the order of the LIC/LIR array 820 and sent to each of the bit plane encoders 810-0 to 810-15.

The LSC reader 814 accesses and reads the LSC coefficient list 822 in order and the corresponding node stored in the buffer 824. The reader 814 generates and outputs, for each read coefficient, the max_bit number, the max_max_bit number and the actual pixel value. The data is output to the bit plane encoders 810-0 to 810-15 from the most significant sublist [left to right] to the least significant sublist. The bit zero of the pixel goes to bit plane encoder 810-0, bit one of the pixel goes to bit plane encoder 810-1, and so on through to bit fifteen of the pixel which goes to bit plane encoder 810-15.

The bitplane encoders 810-0 to 810-15 are each assigned a constant herein called bit_plane_processing, wherein the bitplane encoder 810-0 is assigned a bit_plane_processing constant of zero, the encoder 810-1 a constant of one, and so on through to bit plane encoder 810-15 which is assigned a bit_plane_processing constant of fifteen. The bitplane encoders 810-0 to 810-15 each have a LSC filter and parallel LIC and LIR filters (not shown). The output data from the LSC reader 814 is fed to the LSC filters and the output data from the LIC/LIR reader 812 is fed to both the LIC and LIR filters. The LIR, LIC and LSC filters of the bit plane encoders 810-0 to 810-15 perform the following operations:

1. Filtering Rules for LIC filter
IF flag is set to pixel
    IF max_max_bit>bit_plane_processing THEN
        IF max_bit>bit_plane_processing THEN
            Ignore
        ELSE IF max_bit=bit_plane_processing THEN
            Output One and sign bit
        ELSE
            Output Zero
        ENDIF
    ENDIF
ENDIF 2. Filtering Rules for LSC filter
IF max_max_bit>bit_plane_processing THEN
    IF max_bit>bit_plane_processing THEN
        Output data bit
    ENDIF
ENDIF 3. Filtering Rules for LIR filter
IF flag is set to pixel
    IF max_max_bit=bit_plane_processing THEN
        IF max_bit=bit_plane_processing THEN
            Output one and sign bit
        ELSE
            Output zero
        ENDIF
    ENDIF
ELSE
    IF max_max_bit>=bit_plane_processing THEN
        IF max_bit=bit_plane_processing THEN
            Output one
        ELSE IF max_bit<bit_plane_processing THEN
            Output zero
        ENDIF
    ENDIF
ENDIF The LIC, LIR, and LSC filters of the bit plane encoders 810-0 to 810-15 output the output bits to the respective LIC, LIR, LSC storage elements 826-0 to 826-15, 828-0 to 828-15, and 830-0 to 830-15.

These output bits are subsequently fed to the bit plane combiners 816-0 to 816-15.

The bit plane combiners 816-0 to 816-15 concatenate these output bits in format order LIR LIR LSC which are then stored in the bit plane code buffers 832-0 to 832-15. The block code combiner 818 then concatenates the coded output in the block code buffers commencing with buffer 832-0 and finishing with buffer 832-15. Thus resulting in the coded output bit stream LIR LIC LIR LSC . . . Afterwards the combiner 818 adds a special block termination code. It is in this way, that the encoder 800 is able to encode the 32×32 block of coefficients in parallel. Each of the bitstream 810-n to 832-n operate simultaneously in parallel thus speeding up the computational process. As can be seen the nth bitstream 810-n to 832-n outputs a coded output bitstream equivalent to the output of the nth iteration of the preferred method.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

We claim:

1. An encoder for generating a coded representation of a digital image, said encoder comprising:
    an input means for inputting a block of coefficients of said digital image;
    a plurality of tree builders, wherein each tree builder generates a tree and nodes based on a corresponding bitplane of said block of coefficients, and each said node corresponds to one of a plurality of sub-regions of said block of coefficients or to one of said coefficients and each said node having a data value indicative of the significance of said one sub-region or said one coefficient for that bitplane;
    a bitplane converter for generating respective bitplanes from the block of coefficients; and
    a bitplane encoder coupled to said plurality of tree builders and said bitplane converter for producing a coded representation of the digital image from said trees and bitplanes, wherein said bitplane encoder codes the significance of said sub-regions or coefficients in a current said bitplane when said sub-regions and coefficients have corresponding most significant bits in the current bitplane or less and codes corresponding bits of coefficients in said current bitplane when said coefficients have corresponding most significant bits in a bitplane greater than the current bitplane.

2. An encoder as claimed in claim 1, wherein said encoder further comprises: first storage means, coupled to said bitplane encoder, for temporarily storing a list of insignificant coefficients.

3. An encoder as claimed in claim 1 or 2, wherein said encoder further comprises: second storage means, coupled to said bitplane encoder for temporarily storing a list of significant coefficients.

4. An encoder as claimed in claim 1, wherein said encoder further comprises: third storage means, coupled to said bitplane encoder for temporarily storing a first list of insignificant regions.

5. An encoder as claimed in claim 1, wherein said encoder further comprises: fourth storage means, coupled to said bitplane encoder for temporarily storing a second list of insignificant regions.

\* \* \* \* \*